United States Patent [19]

Schlichte

[11] 4,186,277
[45] Jan. 29, 1980

[54] TIME DIVISION MULTIPLEX TELECOMMUNICATIONS SWITCHING NETWORK

[75] Inventor: Max Schlichte, Munich, Fed. Rep. of Germany

[73] Assignee: Siemens Aktiengesellschaft, Fed. Rep. of Germany

[21] Appl. No.: 908,636

[22] Filed: May 23, 1978

Related U.S. Application Data

[63] Continuation of Ser. No. 759,272, Jan. 14, 1977, abandoned.

[30] Foreign Application Priority Data

Jan. 23, 1976 [DE] Fed. Rep. of Germany ....... 2602561

[51] Int. Cl.² ........................................... H04Q 11/04
[52] U.S. Cl. ........................... 179/15 AT; 179/18 GF
[58] Field of Search ....... 179/18 GF, 18 AG, 15 AT, 179/15 AQ; 340/166 R

[56] References Cited

U.S. PATENT DOCUMENTS

| | | | |
|---|---|---|---|
| 3,132,210 | 5/1964 | Adelaar | 179/18 GF |
| 3,204,033 | 8/1965 | Adelaar | 179/15 AT |
| 3,317,897 | 5/1967 | Ceonzo | 179/18 GE |
| 3,458,659 | 7/1969 | Sternung | 179/15 AQ |
| 3,573,381 | 4/1971 | Marcus | 340/166 R |
| 3,731,275 | 5/1973 | Lenk | 340/166 R |
| 3,891,807 | 6/1975 | Charransol | 179/18 GF |
| 3,956,593 | 5/1976 | Collins | 179/15 AT |

Primary Examiner—David L. Stewart
Attorney, Agent, or Firm—Schuyler, Birch, McKie & Beckett

[57] ABSTRACT

A time division multiplex (TDM) switching network for a telecommunications system or the like is described. The network contains switching network units for causing time slots formed on connected TDM lines to be assigned on a space/time division basis. The TDM lines are formed into trunk groups, and the trunk groups, respectively, form the row and column lines of a matrix. The switching network units are arranged at the crosspoints of the trunk groups to form the crosspoint switching elements between the intersecting trunk groups or between lines of the same trunk group. Each switching network unit is constructed to have a capacity for completing a number of connections less than the number of connections the crosspoint with which it is associated is capable of carrying.

7 Claims, 6 Drawing Figures

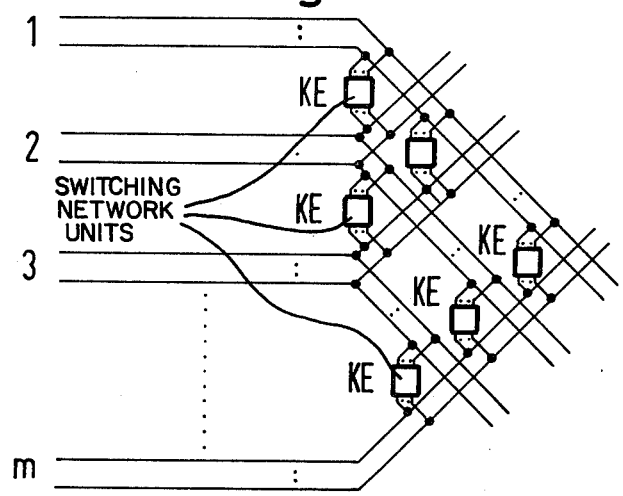
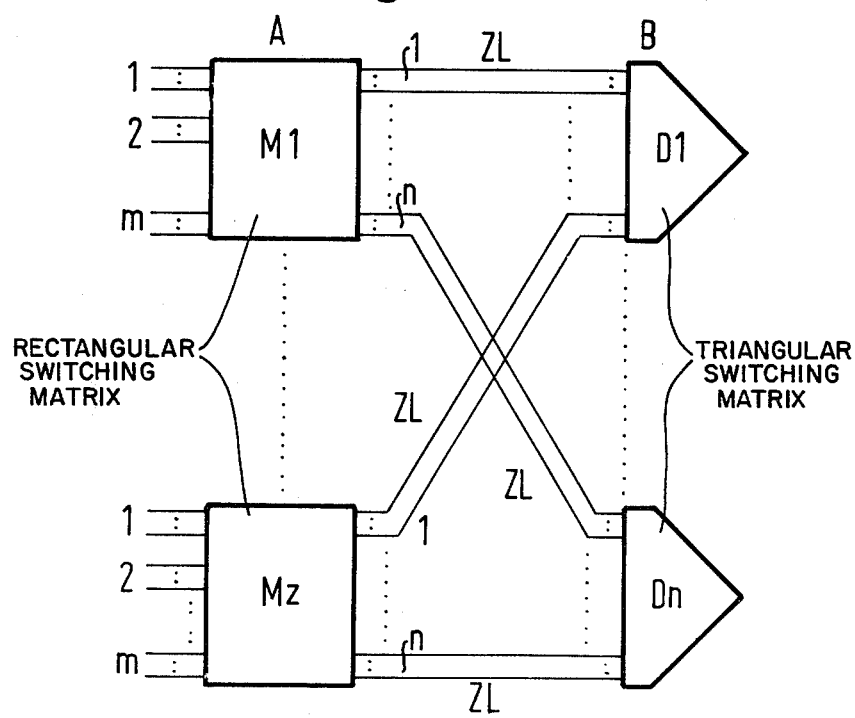

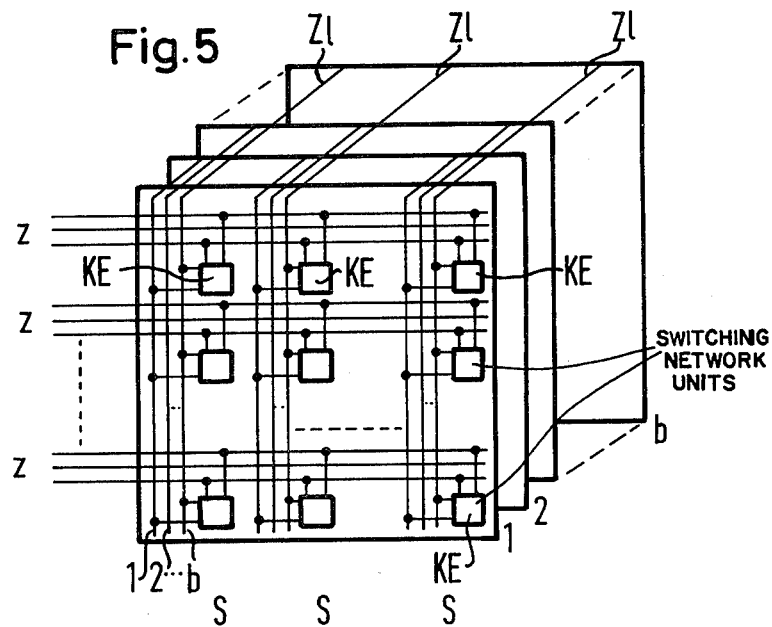
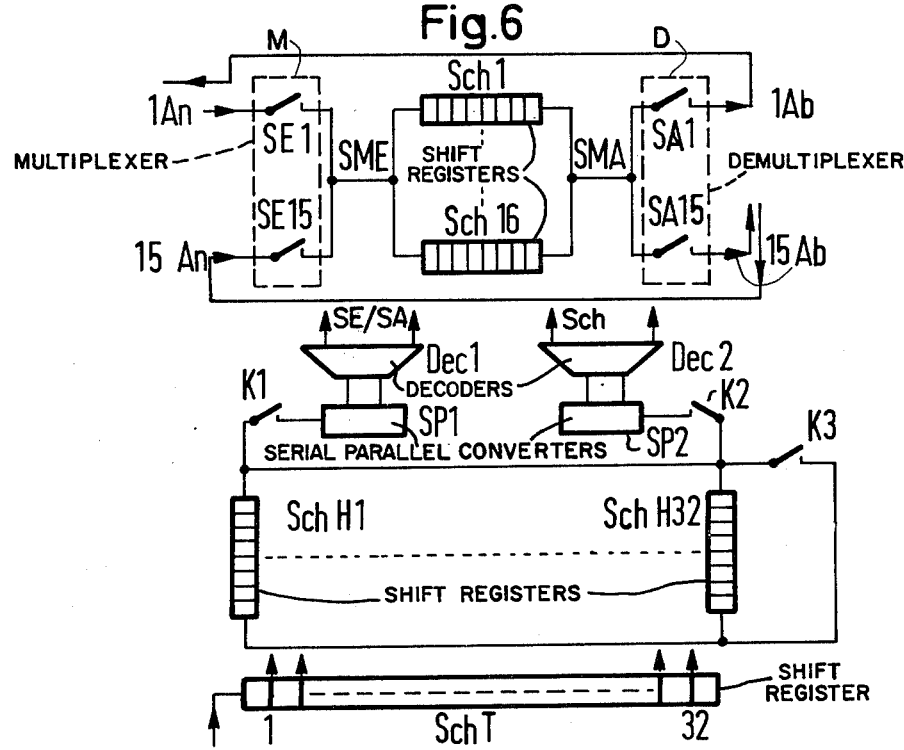

TIME DIVISION MULTIPLEX TELECOMMUNICATIONS SWITCHING NETWORK

This is a continuation of application Ser. No. 759,272, filed Jan. 14, 1977 now abandoned.

BACKGROUND OF THE INVENTION

The invention relates to a time division multiplex (TDM) switching network for a telecommunication system or the like having a plurality of switching network units, each of which causes time slots formed on connected TDM lines to be assigned on a space/time-division basis.

The use of this type of switching network unit, which carries out substantially all of the functions of a small TDM central office, is made feasible by its construction according to large-scale integration techniques (LSI). Thus, large switching networks of virtually any size can be built up with only a few types of such switching network units. A network built for a given initial capacity can then be readily expanded to accommodate increased traffic requirements.

According to one design of TDM switching networks, through the use of such switching network units, West German Patent Application No. P 24 44 854.2, a total of three types of switching network units are provided with, respectively, eight, sixteen or twenty-four terminals for TDM lines. Two types of these units are components of a first and a second switching network stage having at least one switching network level. The selection of which of the foregoing units to be used is dependent on the overall size of the switching network.

As long as in such TDM switching networks there are still unwired TDM terminals in the switching network units of the second stage of a switching network level, the switching network can be expanded simply by adding further switching network units in the first stage and by properly connecting the further units through links with the free terminals of the second stage.

If all the TDM line connections of the second stage of a switching network level are wired, further expansion of the switching network is no longer possible without rejumpering existing link arrangements.

In the prior art TDM switching network referred to above, it is not possible to handle the traffic of the TDM lines connected to a switching network unit forming the first switching stage even via another switching network unit. Therefore, the switching network units of the first stage must be designed for a comparatively low number of connections. However, if the two-stage design is to be maintained, this will have as a result that switching network units with relatively greater numbers of terminals in the second stages of the switching network levels must be used.

Since in integrated circuit technology the design costs are of great consequence, it is advantageous to have a single type of switching network unit which forms the basic unit out of which entire switching networks are built on an expandable basis.

Therefore, it is an object of the invention to provide a single type of switching network unit, a plurality of which are used to form a TDM switching network of any desired capacity and which may be expanded to a desired greater capacity through the use of said single type switching network units.

SUMMARY OF THE INVENTION

In accordance with the invention, the foregoing and other objects of the invention are realized in a TDM switching network of the type described hereinabove, wherein the TDM lines as trunk groups form a matrix-type arrangement on the crosspoints of at least one switching network unit connected to the individual trunks of two trunk groups. Connections are established between TDM lines of both trunk groups and between TDM lines within both trunk groups. The switching network unit has a traffic-handling capacity smaller than that for the complete network.

As desired, the design of a TDM switching network in accordance with the teachings of the invention affords the possibility, through the use of a single type of switching network unit, of expandably constructing switching networks of any desired size without the need for rewiring.

In view of the switching network design in accordance with the invention, according to which the traffic carried by TDM lines of a trunk group can be handled over more than one switching network unit, comparatively favorable circumstances prevail even with regard to lost calls if such a switching network unit fails.

The undercapacity of the individual switching network units provided within the scope of the invention prevents redundancy, particularly if large switching networks are designed. On the other hand, according to another specific embodiment of the invention, by paralleling switching network units on the individual crosspoints of the switching matrix one can adapt to the prevailing traffic conditions. This is particularly desirable for designing small switching networks in which the traffic carried on the crosspoints is comparatively heavy.

BRIEF DESCRIPTION OF THE DRAWINGS

The principles of the invention will be more readily understood by reference to the description of a preferred embodiment given below in conjunction with the drawings which are described briefly as follows:

FIGS. 2 through 5 are schematic diagrams of alternative forms of the switching network of the invention.

FIG. 6 is a schematic diagram of an exemplary embodiment of a switching network unit designed in accordance with the invention and which is used for the construction of said switching network.

DETAILED DESCRIPTION OF THE PREFERRED EMBODIMENTS

Figure 1:
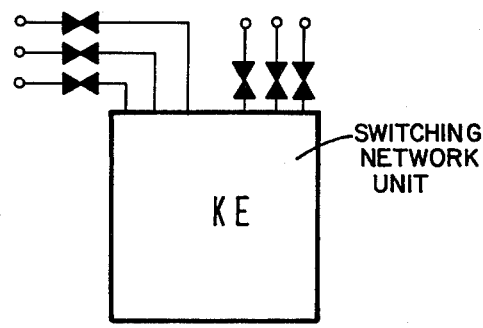
FIG. 1 is a schematic illustration of a switching network unit as used for designing the switching network in accordance with the principles of the invention.

Using the switching network unit shown in FIG. 1, one may switch both on a space-division and on a time-division basis between TDM lines connected thereto. The double arrows on the individual terminals indicate that these are terminals for incoming and outgoing wire pairs of the PCM TDM lines. The presence of terminals for different groups of TDM lines is indicated by bringing the terminals out in various directions. In this case, the distribution of the total number over one or the other group of terminals may be arbitrary. Such a switching network unit must be so designed that through it one may establish a connection from a TDM line connected to the first group of terminals to a TDM line connected to the second group of terminals, as well as between TDM lines connected to the same group of terminals. The construction and operation of a preferred form of the switching network unit is described in detail hereinbelow.

Figure 2:
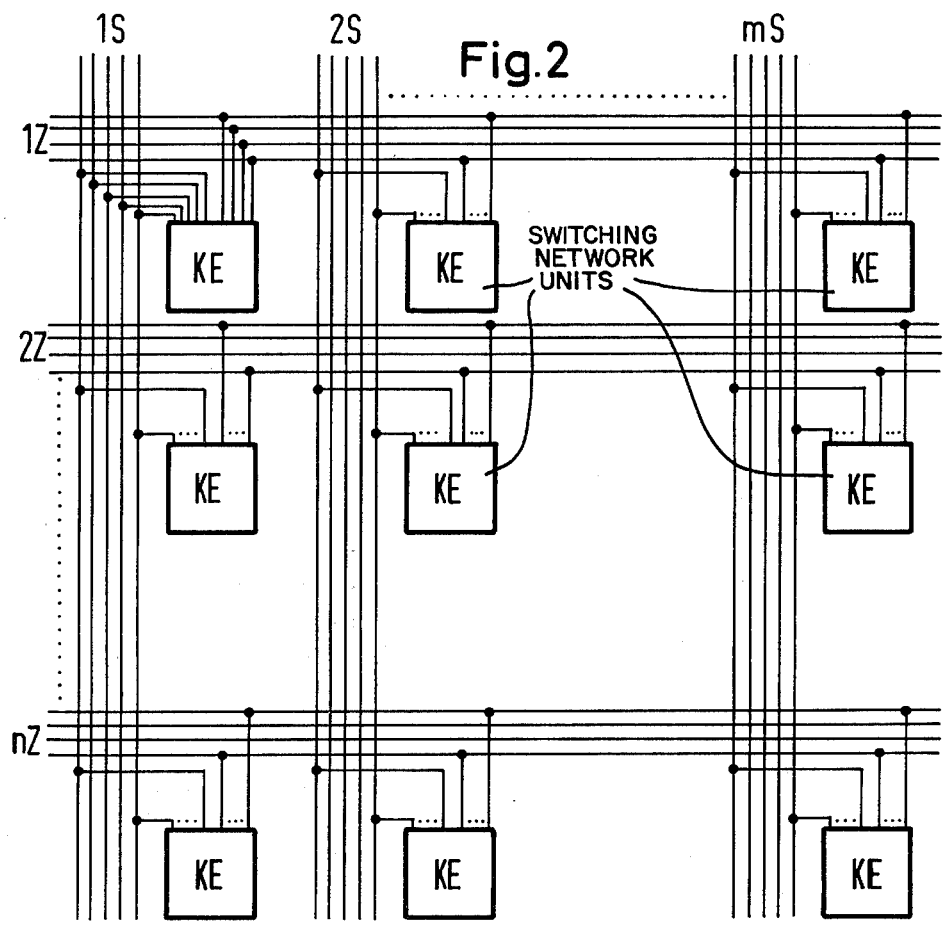

A first practical example of the switching network designed according to the invention is shown in FIG. 2 using the device illustrated in FIG. 1. The switching arrangement in FIG. 2 is a matrix-type switching arrangement of PCM trunk groups 1Z–nZ, each of which comprises, e.g., four PCM TDM lines and constituting the groups of rows of the switching arrangement, as well as TDM trunk groups 1S–mS, each of which comprises, e.g., five PCM TDM lines and groups of columns. At the crosspoints of the PCM TDM trunk groups at least one switching network unit KE is connected with the terminals of one group of terminals thereof to the TDM lines of a group of rows and with the terminals of the second group of terminals thereof to the TDM lines of a group of columns.

The individual equally large switching network units KE have a traffic-carrying capacity smaller than that corresponding to full availability. That is, if Zk denotes the number of time slots on the individual TDM lines, fewer than $\frac{1}{2}(4+5) \times Zk$ connections can be established via such switching network unit under the circumstances outlined above for the example in question, because in the case of larger switching networks full availability via a switching network unit would constitute an unnecessary redundancy. It is not very likely that all the connections possible from the TDM lines of a group of columns have to be established via the same switching network unit, i.e., exclusively to TDM lines of the same group of columns and/or to TDM lines of one and the same group of rows. For practical requirements a switching network module with fifteen PCM four-wire line connections is suggested over which sixteen conversations may be conducted simultaneously.

According to another specific embodiment of the invention, in the case of small switching networks wherein the traffic load at the individual crosspoints between trunk groups is heavier, one may meet the requirements by connecting one or more switching network units in parallel with the existing switching network unit in conformity with the particular requirements. In FIG. 2 a few of the parallel-connected switching network units are shown by a dotted line.

The switching network shown may be simply expanded by properly connecting to the existing trunk groups additional TDM trunk groups of vertical lines and/or further TDM groups of rows using additional switching network units.

As apparent from FIG. 2, the failure of a switching network unit does not necessarily lead to the loss of all the calls that may be set up over the TDM lines of the trunk groups connected to the switching network unit.

If, as assumed, the TDM lines are four-wire lines, it is not possible in the case of the trunking scheme illustrated in FIG. 2, to readily establish connections between TDM lines which are associated with different trunk groups of the same type which, for instance, are parts of different row (or horizontal line) trunk groups. Hence, as will be explained further below, the trunking scheme is particularly suitable for use in larger switching networks. In the latter case the one type of trunk group does not comprise TDM lines which lead to other central offices but TDM lines which establish a connection with additional switching matrices within the switching network. There are no such restrictions if the TDM lines are two-wire lines. In this case, a connection may, for example, be established between a TDM line of a row trunk group with a TDM line of another row trunk group over a first switching network unit, a TDM line of a vertical trunk group and over an additional switching network unit.

Other switching network configurations embodying the invention will now be described with reference to FIGS. 3 through 5.

FIG. 3 shows a switching matrix having the form of a triangular or cut switching matrix.

The switching matrix shown in FIG. 3 may be visualized as one half of a squared switching matrix cut along a diagonal line, the crosspoint switching elements of the crosspoints on the line of intersection being replaced by electrical connections which are at the same time the terminals for the incoming and outgoing lines and, in this case, for the TDM trunk groups. In the presence of m such TDM trunk groups, the triangular matrix requires $m(m-1)/2$ switching network units. In this case, it is possible to establish over only one switching network unit connections between TDM lines that are associated with one and the same trunk group, as well as between TDM lines that are associated with any of the connected trunk groups.

FIG. 4 shows a trunking example of a switching network which in the A stage consists of rectangular switching matrices, as shown in FIG. 1, and in the B stage of triangular switching matrices, as shown in FIG. 3. In the case of z rectangular switching matrices of the A stage with m input TDM trunk groups (e.g., trunk groups of horizontal lines of FIG. 2) and n output trunk groups (which, therefore, are trunk groups of vertical lines), n m-terminal triangular switching matrices are needed. In this case, a connection is established between each output trunk group of the switching matrices of the A stage with each trunk group terminal of the triangular switching matrices of the B stage via links ZL. In this trunking scheme, connections established between TDM lines of various trunk groups are set up over three switching network units, viz. over a second switching network unit of a switching matrix of the B stage and again over the same or over another switching network of switching matrices of the A stage.

Finally, FIG. 5 shows still another version of a reverse trunking scheme embodying the invention. The switching network therein comprises a number of switching matrix levels, each of which contains a squared or rectangular switching arrangement of trunk groups of horizontal lines Z or vertical lines S, respectively. The trunk groups of horizontal lines comprise the TDM lines going out from or leading to the central office with which the switching network is associated. The trunk groups of vertical lines are trunk groups over which, together with links Z1, connections are established with another switching network level. In this case, this switching arrangement is so designed that each TDM line of one trunk group of vertical lines S is connected with a TDM line of an equal-ranking trunk group of vertical lines of another switching network level. It follows that in the case of b TDM lines per group of columns there must be $Sb+1$ switching network levels. Thus, in this case a connection between a TDM line of a trunk group of horizontal lines of a first switching network level with a TDM line of a trunk group of horizontal lines of another switching network level is established over two switching network units.

A switching network unit designed in accordance with the invention and which is particularly suitable for use in the type of switching networks described hereinabove will be described with reference to FIG. 6.

The switching network unit of FIG. 6 is designed for connecting five PCM TDM lines and for simultaneously establishing 16 connections. As a timing circuit component it has sixteen shift registers Sch1–Sch16 corresponding to the number of connections that may be established concurrently. Each of these shift registers has eight shift register stages corresponding to one 8-bit PCM word length.

The shift registers may be connected at their inputs to a common super TDM line SME and by this means to gates 12 SE1–SE15 of a multiplexer M that are connected to the super TDM line with the 15 incoming pairs of line wires 1An–15An of the connected TDM lines. At their outputs the shift registers Sch1–Sch16 are connected to a common outgoing TDM line SMA and by this means to gates SA1–SA15 of a demultiplexer D. The demultiplexer provides outputs to the corresponding 15 outgoing pairs of line wires 1Ab–15Ab of the TDM lines. The gates for connecting associated pairs of line wires, e.g., gates SE1 and SA1, are activated in pairs.

To selectively activate the gates of multiplexer M and demultiplexer D and of shift registers Sch1–Sch16 of the timing circuit component there is provided a holding circuit having a number of shift registers (in this case, e.g., 32 shift registers SchH1–SchH32) corresponding to the number of time slots of the PCM switching system. The inputs and outputs of the shift registers SchH1–SchH32 are interconnected. The shift registers are employed for simultaneously storing a TDM line address, e.g., an access address for gates SE or SA, respectively, and an address of shift registers Sch1–Sch16 of the timing circuit component. In the present case, with fifteen connected TDM lines and sixteen simultaneously possible connections, each of said addresses has four bits that have shift registers, i.e., eight shift register stages each.

The interconnected outputs of shift register Sch1–Sch32 may be connected via a first gate K1 to a first serial-parallel converter Sp1. A first decoder Dec1 is connected to the parallel outputs of the serial-parallel converter, and the outputs of the first decoder Dec1 supply the control signals for gates SE1–SE15 of the multiplexer or for gates SA1–SA15 of the demultiplexer, respectively. The gate K1 is connected during the time of transmission of a line address.

The outputs of the shift registers are additionally connected via a second gate K2 to a second serial-parallel converter SP2 to which there is properly connected a second decoder Dec2, whose outputs supply the enabling signals for the shift register clock pulses of the timing circuit shift registers Sch1–Sch16. Gate K2 is closed during the time of transmission of an address of the shift registers of the timing circuit.

The outputs of shift registers SchH1–SchH32 of the holding circuit may likewise be connected to the inputs of the shift registers over a third gate K3. Gate K3 is normally closed and is opened only during a reentry of addresses into the shift registers of the holding circuit.

The holding circuit further contains another shift register SchT comprising 32 shift register stages and corresponding to the number of time slots of the TDM system. A signal fed to the shift register at the beginning of a pulse frame is shifted with the channel clock pulse so that a signal whose timing is automatically varied between given limits is transmitted from time slot to time slot to the individual register outputs. The aforementioned is an enabling signal for the shift register clock pulse of one of the other holding circuits shift registers SchH1–SchH32.

If, for example, by means of the above described switching network unit, a connection must be established between time slot 10 used on TDM line 1 with time slot 20 used on TDM line 15, the following processes will take place. The address of gate SE1 of multiplexer M or the address of gate SA1 of demultiplexer D is written into the 10th holding circuit shift register SchH10. In addition, an entry is effected into the shift register SchH10 of one of the still unused timing circuit shift registers Sch1–Sch16. The address of gates SE15 and SA15 as well as the same timing circuit shift register address written into shift register SchH10 is entered into holding circuit shift register SchH20.

Now, when during time slot 10 an enabling signal for holding circuit shift register SchH10 is supplied by shift register SchT of the holding circuit and the enabling signal is read, the address of TDM line 1 travels over the initially closed gate K1 to serial-parallel converter Sp1, is decoded by decoder Dec1 and causes gates SE1 and SA1 to be closed. Simultaneously with the input of the address into serial-parallel converter SP1 renewed writing takes place to shift register SchH10 by means of closed gate K3. At the end of four bit intervals, gate K1 is reopened and gate K2 closed instead, so that the address now read from shift register SchH10 travels to serial-parallel converter SP2 and, after decoding by decoder Dec2, accesses one of shift registers Sch1–Sch16 of the timing circuit component. Thus, information that is supplied during time slot 10 on incoming line wire pair 1An of the first TDM line travels via gate SE1 to one of the shift registers Sch1–Sch16, and at the same time, information held in the shift register is sent via outgoing super TDM line SMA and gate SA1 to the outgoing line wire pair of said TDM line.

Corresponding processes are performed during time slot 20, i.e., from shift register SchH20 the addresses of gates SE15 and SA15 are read and decoded once again for the timing circuit shift register. Thus, during this time slot gates SE15 and SA15 are closed, and the information stored until then in the timing circuit shift registers is emitted to outgoing line wire pair SA15. During this time slot information incoming on incoming line wire pair SE15 of the 15th TDM line may be coupled to the shift register via incoming super TDM line SME. Thus, the time sots of both TDM lines are coordinated on a space/time-division basis. As indicated earlier, data associated with other connections may be buffered in the other shift registers Sch1–Sch16 at the same time as the processes described hereinabove.

The principles of this invention are described hereinabove by describing alternative preferred embodiments. It is contemplated that the described embodiments can be modified or changed in ways known to those skilled in the art while remaining within the scope of the invention as defined by the appended claims.

I claim:

1. A time division multiplex (TDM) switching network not operating with freedom from congestion comprising:
   a first plurality of TDM lines forming a first trunk groups and a second plurality of TDM lines forming second trunk groups, said first and second trunk groups being arranged to form, respectively, the rows and columns of a switching matrix, and at least one switching network unit means, arranged at each crosspoint of a first and second trunk group for forming connections between lines in said first and second trunk groups and between lines in said first and between lines of said second trunk groups, for causing connections on TDM lines connected thereto to be assigned on a space division basis and on a time division basis.

2. The switching network defined in claim 1 wherein at least two of said switching network units are connected in parallel at each said crosspoint.

3. The switching network defined in claim 1 wherein said first and second trunk groups are arranged to form a triangular switching matrix.

4. The switching network defined in claim 1 wherein said first and second trunk groups are arranged to form at least three switching matrices, two of said switching matrices being rectangular and the third being triangular, and having a plurality of links connecting said second type trunk groups in said rectangular switching matrices to corresponding trunk groups in said triangular switching matrix thereby by forming a three stage switching network.

5. The switching network defined in claim 1 wherein said first and second trunk groups are arranged in at least two rectangular switching matrices and having a plurality of links interconnecting, respectively, equally ranked lines in said second trunk groups.

6. The switching network defined in claim 1 wherein each said switching network unit comprises:

multiplexer means for selectively connecting a plurality of incoming TDM lines to a common incoming TDM line thereby forming a space division network, a first number of shift registers corresponding to the number of connections the switching network unit is capable of completing, said shift registers having inputs connected to said common incoming TDM line, a common outgoing TDM line having inputs connected to outputs of said shift registers, demultiplexer means for selectively connecting outgoing TDM lines to said common outgoing TDM line, and means for operating said multiplexer means and said demultiplexer means selecting corresponding ones of said incoming and outgoing TDM lines.

7. The switching network defined in claim 6 wherein said means for operating comprises:

a second number of shift registers corresponding to the number of time slots on the connected TDM lines and having, respectively, inputs and outputs connected in common for simultaneously storing a TDM line address and an address of one of said first number of shift registers, first serial to parallel converter, first gate means for connecting the common output of said second shift registers to said first serial to parallel converter for the duration of a line address, first decoder means for receiving the output of said first serial to parallel converter and for supplying control signals to said multiplexer and demultiplexer for the selection of incoming and outgoing TDM lines, second serial to parallel converter, second gate means, operative in alternation with said first gate means, for connecting the common output of said second shift registers to said second serial to parallel converter for the duration of a shift register address, second decoder means for receiving the output of said second serial to parallel converter and for supplying enabling signals to said first shift registers, third gate means, operative during periods of operation of one of said first and second gate means, for connecting the common input and output of said second shift registers, and timing means for supplying clock pulses at variable times to said second shift registers.

* * * * *